US012593193B2

(12) United States Patent
Ganguly et al.

(10) Patent No.: US 12,593,193 B2
(45) Date of Patent: Mar. 31, 2026

(54) DETERMINING SPATIAL IMPULSE RESPONSE VIA ACOUSTIC SCRAMBLING

(71) Applicant: HARMAN INTERNATIONAL INDUSTRIES, INCORPORATED, Stamford, CT (US)

(72) Inventors: Anshuman Ganguly, Commerce, MI (US); Kadagattur Gopinatha Srinidhi, Northville, MI (US)

(73) Assignee: Harman International Industries, Incorporated, Stamford, CT (US)

(*) Notice: Subject to any disclaimer, the term of this patent is extended or adjusted under 35 U.S.C. 154(b) by 296 days.

(21) Appl. No.: 18/362,384

(22) Filed: Jul. 31, 2023

(65) Prior Publication Data

US 2025/0048055 A1 Feb. 6, 2025

(51) Int. Cl.
*H04S 7/00* (2006.01)

(52) U.S. Cl.
CPC .............. *H04S 7/307* (2013.01); *H04S 7/305* (2013.01); *H04S 2420/01* (2013.01)

(58) Field of Classification Search
CPC .......... H04S 7/301; H04S 7/305; H04S 7/307; H04S 2420/01; H04R 29/001
See application file for complete search history.

(56) References Cited

U.S. PATENT DOCUMENTS

2005/0207582 A1 9/2005 Asada
2009/0193895 A1 8/2009 Date et al.

OTHER PUBLICATIONS

Lankaster, Gloria I. "Enhancing Spotify Experience." Medium, Jul. 25, 2023, medium.com/@gl.o/enhancing-spotify-experience-2f2666f0ce6b. (Year: 2023).*

Coelho et al., "A Room Acoustics Measurement Technique Based on a Perceptual Model for Annoyance Minimization", 30th International Conference: Intelligent Audio Environments, Mar. 1, 2007, 10 pages.

Mueller et al., "Transfer-Function Measurement with Sweeps", Journal of the Audio Engineering Society, vol. 49, No. 6, Jun. 1, 2001, pp. 443-471.

Farina, Angelo, "Advancements in Impulse Response Measurements by Sine Sweeps." Presented at the Audio Engineering Society 122nd Convention, Vienna, Austria, May 5-8, 2007, 21 pages.

* cited by examiner

*Primary Examiner* — James K Mooney
(74) *Attorney, Agent, or Firm* — Artegis Law Group, LLP

(57) ABSTRACT

Disclosed embodiments include techniques for determining spatial impulse response via acoustic scrambling. These techniques include a computer-implemented method for generating a frequency sweep signal, the method comprising generating a frequency sweep signal having a monotonically increasing frequency, partitioning the frequency sweep signal into N input segments, each of the N input segments representing a different frequency range, generating an encoding key having a sequence of N non-consecutive numbers, wherein each number in the sequence appears once, generating an output signal by selecting each of the N input segments in an order based on the sequence of N non-consecutive numbers in the encoding key, and causing a speaker to produce audio tones in an audio space based on the output signal.

20 Claims, 11 Drawing Sheets

DETERMINING SPATIAL IMPULSE RESPONSE VIA ACOUSTIC SCRAMBLING

BACKGROUND

Field of the Embodiments of the Present Disclosure

Embodiments of the present disclosure relate generally to audio processing systems and, more specifically, to techniques for determining spatial impulse response using acoustic scrambling.

Description of the Related Art

Audio systems often employ various techniques to improve audio quality and realism experienced by listeners of these audio systems. One such technique involves measuring how sound waves are affected by a particular acoustic space such as a room, concert hall, vehicle passenger compartment, or the like. Such techniques involve computing a room impulse response (RIR) that characterizes how sound waves from a source location are distorted as a result of reflection of the sound waves from surfaces in the acoustic space. The RIR is the time-domain acoustic relationship between a sound source and a receiver in a given acoustic space and indicates the intensity of sound waves received by a microphone over time. Audio systems use the RIR to improve audio quality by determining the appropriate locations for speakers, cancelling echoes or other sounds that reduce audio quality, and so on.

Audio systems can measure the RIR of an acoustic space during a system calibration phase. The RIR of an acoustic space is measured by, for example, using a speaker to generate a stimulus sound, such as a sine sweep or other frequency sweep, and using a microphone to capture resulting sound waves transmitted and reflected through the acoustic space. The sine sweep can be an exponential sine sweep (ESS), in which the generated sound wave amplitude varies according to a sine wave with progressively increasing frequency over a period of time. The frequencies generated in the sine sweep can vary from a low frequency, such as 20 Hz, to a high frequency, such as 20 kHz. This example range corresponds to the range of frequencies that can be heard by humans. The sound waves travel in numerous directions, and each sound wave strikes one or more surfaces, such as walls, furniture, people and other objects within the acoustic space. More typically, when a sound wave traveling in a particular direction strikes an object, some portion of the sound wave is absorbed while some portion of the sound wave is reflected. The reflected portion of the sound wave travels through the acoustic space in a different direction with respect to the direction of the original sound wave. The reflected portion can strike another object, where, again, some portion of the sound wave is absorbed while some portion of the sound wave is reflected. This process continues until the acoustic energy of the sound wave strikes an object and is fully absorbed, and little or no portion of the sound wave is reflected. The RIR represents the total effect of absorption and reflection of all sound waves emanating from the speaker. A microphone can capture the reflected sound waves at a particular location in acoustic space and the captured sound waves can be used to determine the RIR for the particular location.

One drawback with the above approach to generating an RIR is that the sounds transmitted by the speaker when performing the frequency sweep are audibly perceptible to humans and can be disruptive or irritating to human listeners who hear the frequency sweep. The audible frequency sweep is often perceived as a shrill sound, similar to a siren of an ambulance or other emergency vehicle, that produces discomfort in the human auditory system. The audible frequency sweep can also be disruptive or distracting to any human listeners who are near the speaker that generates the frequency sweep sound. An audible volume level is generally used at the transmitting speaker that is sufficiently loud to enable the microphone to detect the frequency sweep sound, so reducing the volume level is not a feasible way to eliminate the audible frequency sweep.

As the foregoing illustrates, improved techniques for determining a room impulse response using an audible frequency sweep would be useful.

SUMMARY

Various embodiments of the present disclosure set forth a computer-implemented method for generating a frequency sweep signal. The method includes generating a frequency sweep signal having a monotonically increasing frequency. The method further includes partitioning the frequency sweep signal into N input segments, each of the N input segments representing a different frequency range. The method further includes generating an encoding key having a sequence of N non-consecutive numbers, wherein each number in the sequence appears once. The method further includes generating an output signal by selecting each of the N input segments in an order based on the sequence of N non-consecutive numbers in the encoding key. The method further includes causing a speaker to produce audio tones in an audio space based on the output signal.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, a room impulse response can be determined using a test audio signal that is less disturbing to human listeners than the test audio signals of prior art techniques. The test audio signal of the disclosed techniques is also more pleasant to human listeners than the test audio signals of prior art techniques. The test audio signal of the disclosed techniques can also be mixed with other sounds such as music to further reduce the disruptiveness of the test audio signal. Further, the disclosed techniques improve the distance range for which accurate wall distance estimates are obtained compared to calculating the wall distance estimates without preserving the reverberation tails. These technical advantages represent one or more technological improvements over prior art approaches.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, can be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments can be practiced without one or more of these specific details or with additional specific details.

Figure 1:
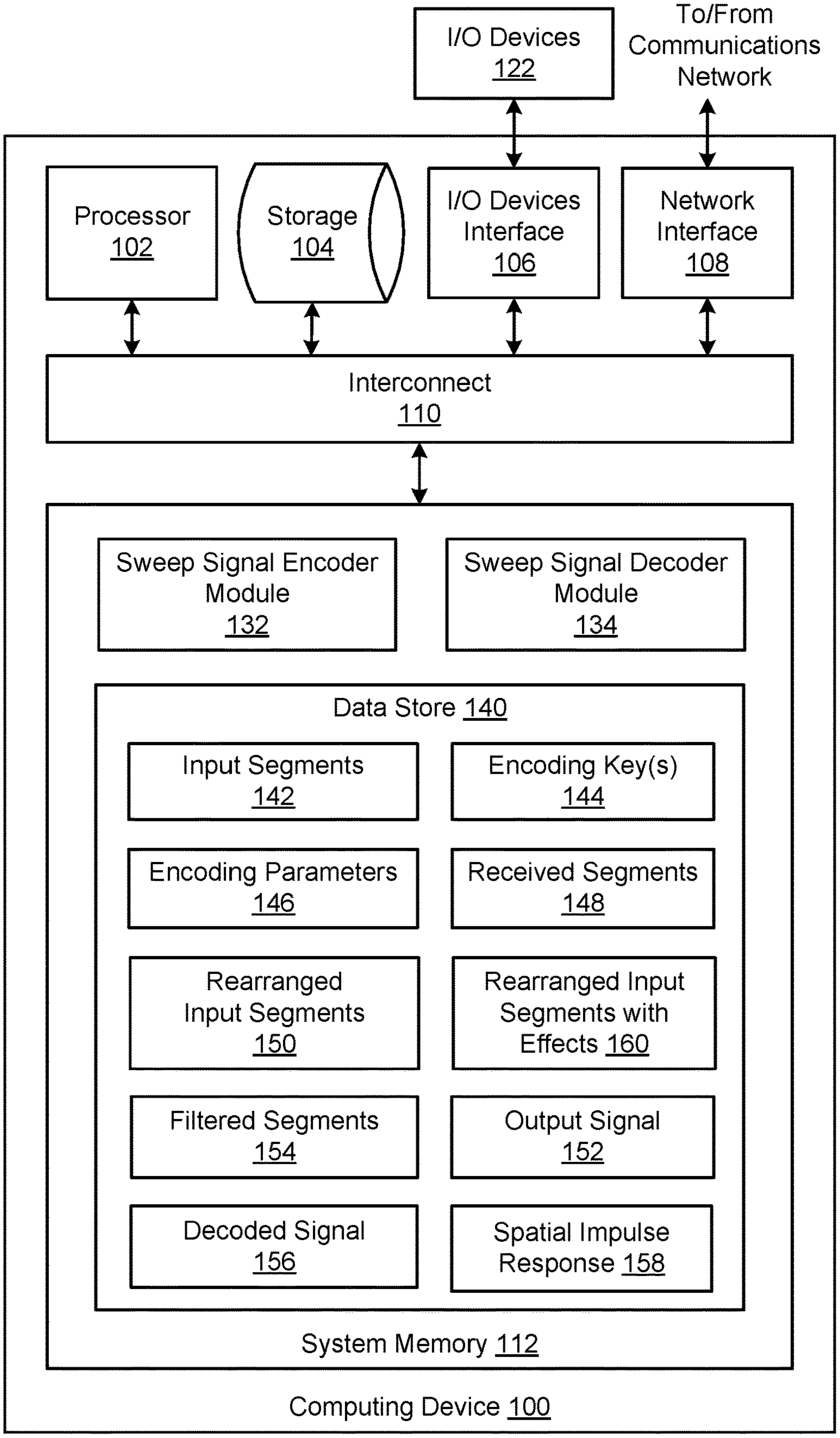
FIG. 1 illustrates a computing system configured to implement one or more aspects of the various embodiments.

FIG. 1 illustrates a computing device 100 configured to implement one or more aspects of the various embodiments. As shown, the computing device 100 includes, without limitation, a processor 102, storage 104, an input/output (I/O) devices interface 106, a network interface 108, an interconnect 110, and a system memory 112.

The processor 102 retrieves and executes programming instructions stored in the system memory 112. Similarly, the processor 102 stores and retrieves application data residing in the system memory 112. The interconnect 110 facilitates transmission, such as of programming instructions and application data, between the processor 102, I/O devices interface 106, storage 104, network interface 108, and system memory 112. The I/O devices interface 106 is configured to receive input data from user I/O devices 122. Examples of user I/O devices 122 can include one or more buttons, a keyboard, a mouse or other pointing device, and/or the like. The I/O devices interface 106 can also include an audio output unit configured to generate an electrical audio output signal, and user I/O devices 122 can further include a speaker configured to generate an acoustic output in response to the electrical audio output signal. Another example of a user I/O device 122 is a display device that generally represents any technically feasible means for generating an image for display. For example, the display device could be a liquid crystal display (LCD) display, organic light-emitting diode (OLED) display, or digital light processing (DLP) display. The display device can be a TV that includes a broadcast or cable tuner for receiving digital or analog television signals. The display device can be included in a head-mounted display (HMD) assembly such as a VR/AR headset or a heads-up display (HUD) assembly. Further, the display device can project an image onto one or more surfaces, such as walls, projection screens or a windshield of a vehicle. Additionally or alternatively, the display device can project an image directly onto the eyes of a user (e.g., via retinal projection).

The processor 102 is included to be representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 112 is generally included to be representative of a random-access memory. The storage 104 can be a disk drive storage device. Although shown as a single unit, the storage 104 can be a combination of fixed and/or removable storage devices, such as fixed disc drives, floppy disc drives, tape drives, removable memory cards, or optical storage, network attached storage (NAS), or a storage area-network (SAN). The processor 102 communicates to other computing devices and systems via the network interface 108, where the network interface 108 is configured to transmit and receive data via a communications network.

The system memory 112 includes, without limitation, a sweep signal encoder module 132 and a sweep signal decoder module 134. The sweep signal encoder module 132 and the sweep signal decoder module 134, when executed by the processor 102, perform one or more operations associated with the techniques described herein. The sweep signal encoder module 132 converts a monotonically increasing frequency sweep signal, such as an ESS signal, to an output signal 152 by partitioning the frequency sweep signal into segments and rearranging the segments into a sequence of rearranged input segments 150 such that there is a discontinuity in frequency between each pair of adjacent rearranged input segments 150. In the rearranged input segments 150, each segment represents a frequency sweep that is a fraction of the duration of the frequency sweep signal 212, and there is an abrupt change in frequency between each pair of segments because of the discontinuity in frequency at the boundaries between segments. In references to the sequence of input segments 142 and other sequences of segments herein, the word "sequence" is omitted for brevity.

The sweep signal encoder module 132 generates an output signal 152 based on the rearranged input segments 150 or, if optional effects such as fade-in, fade-out, and/or inter-segment silence are to be included in the output signal 152, based on the input segments with effects 160. As an example, the output signal 152 can have the same frequencies as the rearranged input segments 150 in the same order as in the rearranged input segments 150. Alternatively, the output signal 152 can have the same frequencies as the input segments with effects 160 in the same order as in the input segments with effects 160. The sweep signal encoder module 132 provides the output signal 152 to a speaker in an acoustic space and causes the speaker to produce audio based on the output signal 152.

The audio produced by the speaker based on the output signal 152 is propagated through and reflected within the acoustic space. A microphone captures sound data based on the sound waves that occur in the audio space as a result of the audio. The sweep signal decoder module 134 generates an input signal based on the captured sound data, identifies a portion of the input signal that corresponds to a portion of the output signal 152, and partitions the input signal into a sequence of received segments 148. The sweep signal decoder module 134 can generate a decoded signal 156 based on a sequence of decoded segments that are in an order that corresponds to the sequence of input segments 142 by performing an inverse mapping using the encoding key 144. The inverse mapping can involve selecting each received segment of the received segments 148 in an order based on the encoding key 144.

The sweep signal decoder module 134 can use one or more band pass filters to remove copies of reverberation tails of segments that are not in the same order as the original signal before re-ordering the received segments 148 to form the decoded signal 156. In some embodiments, the reverberation tails of segments are reordered with the segments after removing frequencies outside the expected frequency ranges of the segments, so the reordered segments include the reverberation tails. The band pass filters convert the received segments 148 to filtered segments 154, and the sweep signal decoder module 134 can generate the decoded signal 156 based on the filtered segments 154, which are in an order that corresponds to the sequence of input segments 142, by performing an inverse mapping using the encoding key 144.

When performing operations associated with the sweep signal encoder module 132, the processor 102 stores data in and retrieves data from portions of the data store 140, such as the input segments 142, the encoding key(s) 144, the encoding parameters 146, the rearranged input segments 150, and the output signal 152. When performing operations associated with the sweep signal decoder module 134, the processor 102 stores data in and retrieves data from portions of the data store 140, such as the encoding key(s) 144, the received segments 148, the filtered segments 154, the decoded signal 156, and the spatial impulse response 158.

Figure 2:
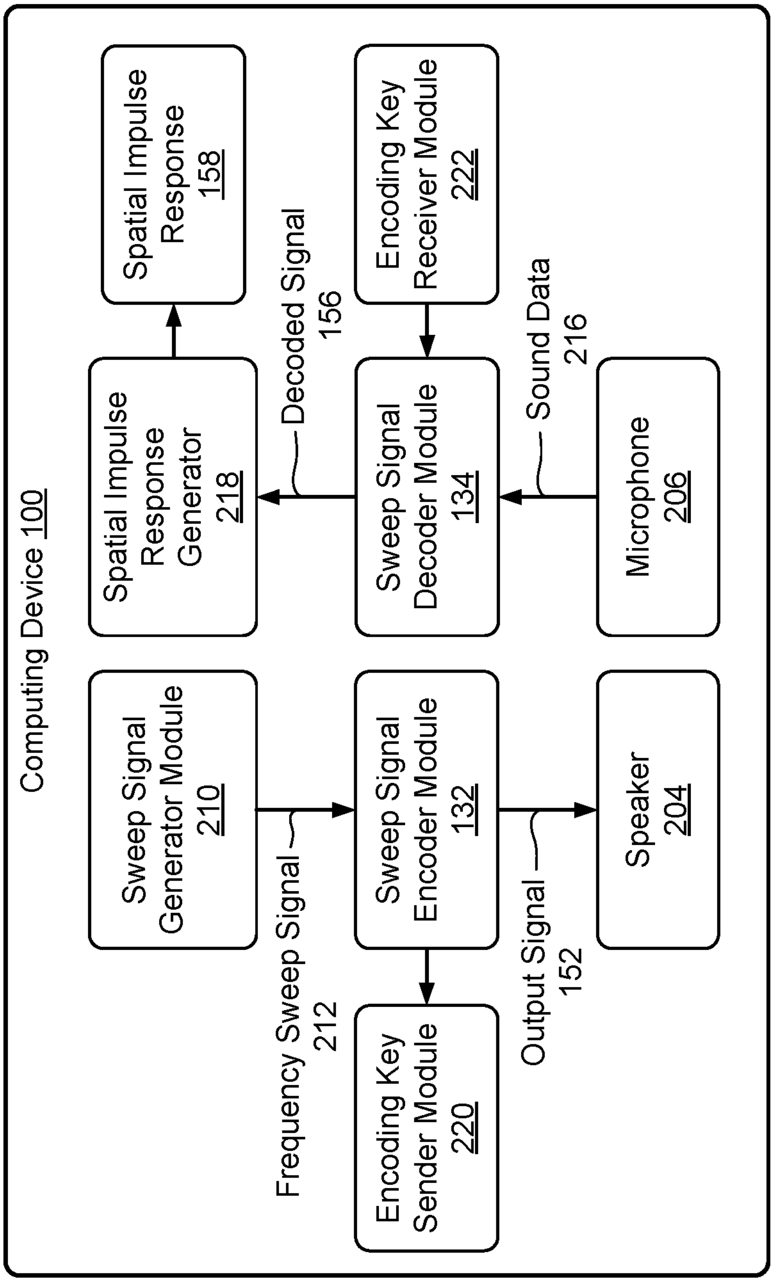
FIG. 2 illustrates a computing system that generates a room impulse response using a modified frequency sweep signal, according to various embodiments.

FIG. 2 illustrates a computing system that generates a room impulse response using a modified frequency sweep signal, according to various embodiments. A computing device 100 includes a frequency sweep signal generator module 210, which generates a frequency sweep signal 212 such as an ESS signal or other signal that varies in frequency over time. A sweep signal encoder module 132 receives the frequency sweep signal 212, partitions the frequency sweep signal 212 into a sequence of N input segments 142 and rearranges the N input segments 142 into a sequence of N rearranged input segments 150 such that there is a discontinuity in frequency between each pair of adjacent rearranged input segments 150. The number N can be specified by or derived from encoding parameters 146. In the rearranged input segments 150, each segment represents a frequency sweep that is a fraction (1/N) of the duration of the frequency sweep signal 212, and there is an abrupt change in frequency between each pair of segments because of the discontinuity in frequency at the boundaries between segments. A modified frequency sweep signal that uses the sequence of shorter-duration discontinuous frequency sweep segments specified by the sequence of rearranged input segments 150 sounds less disruptive and/or more pleasant to human listeners than a longer duration continuous frequency sweep signal because of the shorter durations of the sweeps and the relatively large changes in frequency between the sweeps. Although the N input segments 142 are of equal lengths (e.g., durations) in examples described herein (e.g., 1/N time units each), the N input segments 142 can include two or more segments of different lengths in other examples. If the input segments have different lengths, then each of the different lengths can be a respective predetermined length in a list of predetermined lengths, for example.

The order of the segments in the rearranged input segments 150 can be determined based on an encoding key 144. The encoding key 144 is a sequence of N numbers that identify segments, where N is the number of segments in the input segments 142. The encoding key 144 specifies a modified order of the input segments 142 as a sequence of rearranged segment indexes that is a permutation of an initial order, such as an order in which the segment indexes are monotonically increasing (which corresponds to the order of the segments in the input segments 142). The sweep signal encoder module 132 rearranges the input segments 142 into the modified order specified by the encoding key 144 to form the rearranged input segments 150. The encoding key 144 can include a sequence of N non-consecutive random numbers in which no number is repeated. Alternatively, the encoding key 144 can begin with the number 1 and end with the number N, in which case the sequence elements having indexes 2 through N−1 form a sequence of N−2 non-consecutive random numbers in which no number is repeated. The sequence that begins with 1 and ends with N can be less disruptive and/or more pleasant to human listeners than a sequence that begins and ends with other numbered segments.

The sweep signal encoder module 132 on the computing device 100 generates an output signal 152 based on the rearranged input segments 150 and causes a speaker to produce audio tones in an audio space based on the output signal 152. The same computing device 100 that generates the output signal 152 and causes the speaker to produce the audio tones can use a microphone 206 to capture sound data 216 based on sound waves that occur in the audio space as a result of the speaker producing the audio tones. A sweep signal decoder module 134 on the computing device 100 can then convert the sound data 216 to a decoded signal 156 using the encoding key 144, and a spatial impulse response generator 218 can convert the decoded signal 156 to a spatial impulse response 158.

The sweep signal encoder module 132 can provide the encoding key 144 to an encoding key sender module 220, which can send the encoding key 144 to one or more other computing device(s) 100, e.g., via a communications network. At the other computing device 100, an encoding key receiver module 222 can receive the encoding key 144 via the communication network and provide the encoding key 144 to a sweep signal decoder module 134 so that the other computing device 100 can decode sound data captured by a microphone 206 on the other computing device 100. The sound data captured by the microphone 206 on the other computing device can be based on sound waves that occur in an audio space as a result of audio tones produced by the speaker 204 based on the output signal 152.

Figure 3:
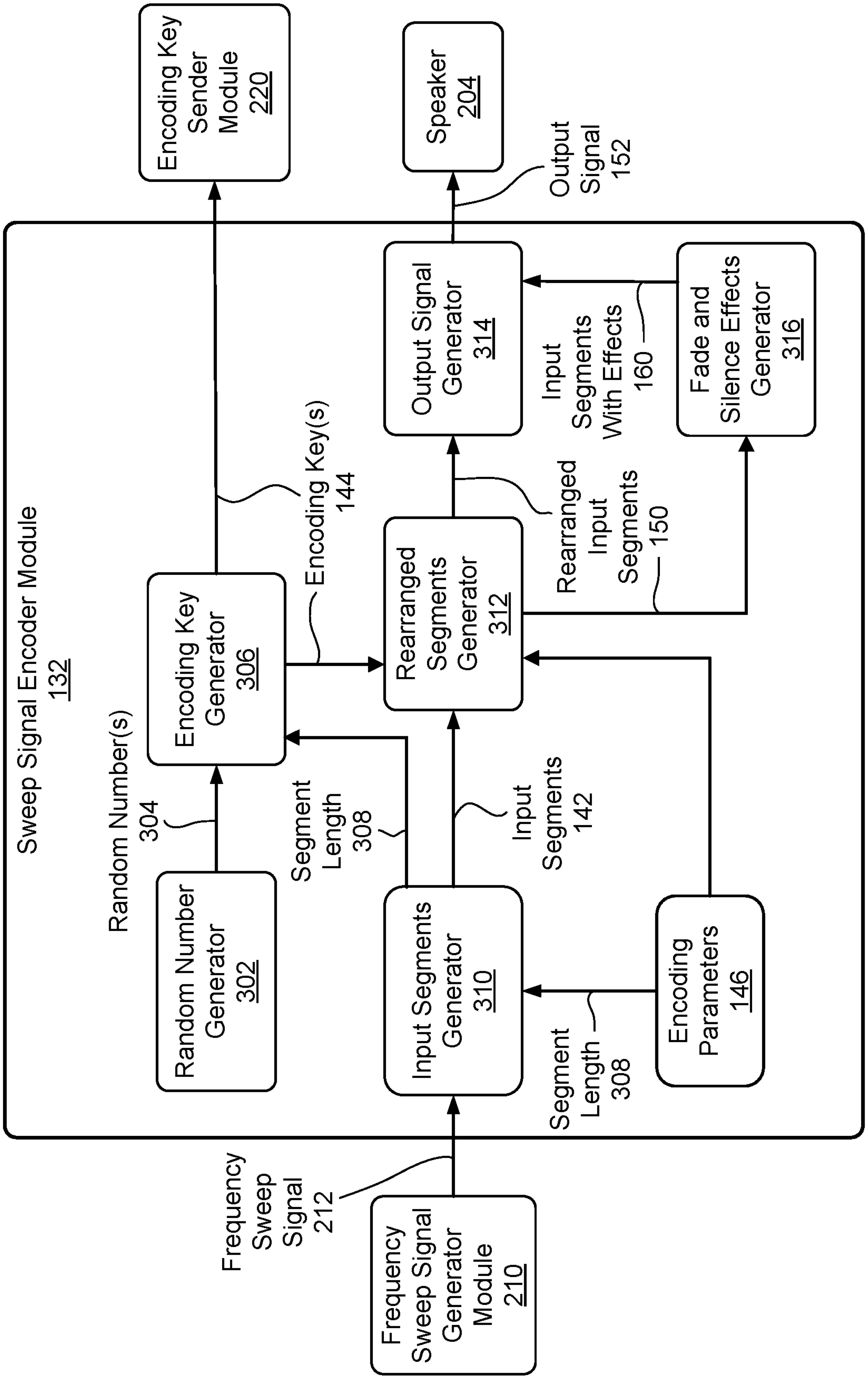
FIG. 3 is a block diagram of the sweep signal encoder module of FIG. 1, according to various embodiments.

FIG. 3 is a block diagram of the sweep signal encoder module 132 of FIG. 1, according to various embodiments. The sweep signal encoder module 132 includes an input segments generator 310, a random number generator 302, an encoding key generator 306, a rearranged segments generator 312, and an output signal generator 314. The input segments generator 310 receives a frequency sweep signal 212 from a frequency sweep signal generator module 210. The frequency sweep signal 212 can be a monotonically increasing frequency sweep signal, such as an ESS signal, or other signal that varies in frequency over time, for example.

The sweep signal encoder module 132 converts the frequency sweep signal 212 to an output signal 152 having a sequence of N segments and rearranges the segments to form a sequence of rearranged input segments 150 having a discontinuity in frequency between each pair of adjacent segments. The resulting output signal 152 sounds less disruptive and/or more pleasant to human listeners than the frequency sweep signal 212 because of the shorter durations of the sweeps and the relatively large changes in frequency between the sweeps in the output signal 152.

The input segments generator 310 partitions the frequency sweep signal 212 into N input segments 142. The number N can be specified by or derived from encoding parameters 146. In one example, the number N can be directly specified by the encoding parameters 146. In another example, the number N can be determined by dividing a length of the frequency sweep signal 212 by a segment length 308 that specifies a length of each segment in time units such as milliseconds (ms). The segment length 308 can be, e.g., 40 ms, and the length of the frequency sweep signal 212 can be, e.g., 200 ms.

The rearranged segments generator 312 permutes the N input segments 142 into a sequence of N rearranged input segments 150 having a discontinuity in frequency between each pair of adjacent rearranged input segments 150. In some embodiments, at least one pair of adjacent rearranged input segments 150 are continuous in frequency (e.g., not separated by a discontinuity), and there is a discontinuity in frequency between at least one other pair of adjacent rearranged input segments 150. In some embodiments, the encoding key 144 is a sequence of N non-consecutive numbers having values selected from the range 1 through N in which no number is repeated. In some embodiments, the encoding key 144 is a sequence of N random non-consecutive numbers having values selected from the range 1 through N in which no number is repeated. In some embodiments, the encoding key 144 is a sequence of numbers in which the first and last numbers are 1 and N, respectively, and the numbers at indexes 2 through N−1 form a sequence of non-consecutive numbers having values selected from the range 2 through N−1 in which no number is repeated. In some embodiments, the numbers at indexes 2 through N—are random non-consecutive numbers having values selected from the range 2 through N−1 in which no number is repeated. The sequence that begins with 1 and ends with N can be less disruptive and/or more pleasant to human listeners than a sequence that begins and ends with other numbers.

Examples of the encoding key 144 include the sequence [1 4 3 2 5], in which the portion of the sequence between the first and last elements is [4 3 2], which is a sequence of non-consecutive numbers. The numbers 4 and 3 are non-consecutive, and the numbers 3 and 2 are non-consecutive, so the sequence [4 3 2] is a sequence of non-consecutive numbers. A sequence containing two consecutive numbers, such as [1, 2] or [2, 3] is not a valid encoding key 144. Other valid encoding keys 144 of length five that start with 1 and end with 5 include [1 2 4 3 5] and [1 3 2 4 5]. Because the encoding key 144 can be a sequence of random numbers that are non-consecutive, a particular encoding key 144 of length five that start with 1 and ends with 5 can be any of [1 4 3 2 5], [1 2 4 3 5], or [1 3 2 4 5], where the particular sequence is selected randomly (e.g., each of the three possible valid sequences could have an equal probability of being selected when generating a particular encoding key 144). Sequences that are of length five, start with 1, and end with 5 that are not valid encoding keys include [1 2 3 4 5]. [1 3 2 4 5], and [1 3 4 2 5]. As another example, [1 5 7 3 8 4 9 6 2 10] is a valid encoding key 144, but [1 5 7 3 4 8 9 6 2 10] is not a valid encoding key because it contains the consecutive numbers 3 and 4 and 8 and 9.

The rearranged segments generator 312 can convert the sequence of input segments 142 to the sequence of rearranged input segments 150 using a mapping operation that determines a rearranged order of the input segments 142. The mapping operation can map the input segments 142 to the rearranged input segments 150 by selecting each of the input segments 142 in an order based on a mapping algorithm and/or based on a mapping data structure referred to herein as an encoding key 144. The encoding key 144 can be generated by the encoding key generator 306 based on one or more random number(s) 304 using a suitable algorithm. The random number(s) 304 can be generated by a random number generator 302.

The encoding key 144 specifies the order in which the input segments 142 are selected. The selection order is specified as a sequence of segment numbers that identify segments in the input segments 142. The selection order can be a random order that conforms to ordering criteria such as being a sequence of non-consecutive segment numbers in which the first and last segments of the input segments 142 (e.g., at indexes 1 and N) are also the first and last segments of the rearranged input segments 150. For example, the encoding key 144 can be a sequence having 1 in the first element and N in the Nth element.

As an example, to generate the encoding key 144, the encoding key generator 306 initializes the encoding key 144 to an empty sequence and generates a sequence of available numbers that initially includes the numbers 2 through N−1. The encoding key generator 306 randomly selects an available number from the sequence of available numbers, adds (e.g., appends) the randomly selected available number to the encoding key 144, and removes the randomly selected available number from the sequence of available numbers. The encoding key generator 306 then identifies the available numbers, if any, that are in the sequence of available numbers and are non-consecutive with the number at the end of the encoding key. If there are no available numbers, then the encoding key generator 306 randomly selects a different available number from the sequence of available numbers. Otherwise, the encoding key generator 306 adds the available number to the encoding key 144 and removes the available number from the sequence of available numbers. The encoding key generator 306 repeatedly performs the above operations until the encoding key 144 includes each number in the range 2 through N−1.

The rearranged segments generator 312 can add (e.g., append) each successive selected input segment 142 to the rearranged input segments 150 in the order in which the input segments 142 are selected. The encoding key 144 can be a sequence of non-consecutive numbers, for example. The encoding key 144 can be a random key, e.g., a random sequence of the indexes of the input segments 142 such that the indexes are non-consecutive. The encoding key 144 can conform to ordering criteria as described above, e.g., elements 1 and N of the sequence of can have the values 1 and N, while elements 2 through N−1 can be in a random sequence of non-consecutive numbers having values selected from the range 2 through N−1.

The non-consecutive numbers in the encoding key 144 are referred to as "elements" of the sequence. Each element in the sequence of non-consecutive numbers has an associated index that ranges from 1 to N, where N is the number of elements in the sequence. Each of the numbers in the encoding key 144 is associated with a source index that represents the position of the number in the encoding key 144. Further, each of the numbers in the encoding key 144 identifies a destination index (e.g., position) in the sequence of rearranged input segments 150 to which a segment identified by the source index in the input segments 142 is to be mapped.

The rearranged segments generator 312 can provide the rearranged input segments 150 to the output signal generator 314, which generates an output signal 152 based on the rearranged input segments 150 and causes a speaker 204 to produce audio tones in an audio space based on the output signal 152. Alternatively, the rearranged segments generator 312 can provide the rearranged input segments 150 to a fade and silence effects generator 316, which applies fade-in, fade-out, and/or silence period effects to the rearranged input segments 150. The fade and silence effects generator 316 generates a sequence of rearranged input segments with effects 160 that includes the fade-in, fade-out, and/or silence period effects. Prior to applying the fade-in and/or fade-out effects, each input segment in the rearranged input segments 150 has a predetermined amplitude A. Further, as described above, each input segment has a segment length 308 specified in time units such as milliseconds (ms).

The fade-in effect applied by the fade and silence effects generator 316 modifies the amplitude of an initial portion of each input segment to gradually increase from an initial value, such as 0 dB, to the amplitude A over a period of time referred to herein as a "fade-in length." The fade and silence effects generator 316 can use gain scaling to apply the fade-in effect over a time period that is specified by the fade-in length and starts at the beginning of each input segment. The fade-in length can be, for example, 25% of the segment length 308. If the segment length 308 is 40 ms, then the fade-in length is 10 ms, for example. The fade-out effect modifies the amplitude of a trailing portion of each input segment to gradually decrease from the amplitude A to the initial value (e.g., 0 dB) over a period of time referred to herein as a "fade-out length." The fade-out length is thus the length of the trailing portion. The trailing portion ends at the end of the input segment. The fade-out length can be, for example, 25% of the segment length 308, in which case the fade-out length is 10 ms, for example.

The silence period effect applied by the fade and silence effects generator 316 inserts a period of silence of a predefined silence length between each pair of adjacent input segments in the sequence of rearranged input segments 150 to form a sequence of rearranged input segments with effects 160 in which the input segments are spaced apart by the silence length. The predefined silence length can be the same as the segment length 308, e.g., 40 ms. As an example, with reference to FIGS. 5C and 5D, the fade and silence effects generator 316 can apply the fade-in, fade-out, and silence period effects to a sequence of rearranged input segments 502 shown in FIG. 5C to produce a sequence of input segment waveforms with effects 506 shown in FIG. 5D. The encoding key sender module 220 can also send the encoding key 144 to another computing device 100 as described herein with respect to FIG. 2.

The sweep signal encoder module 132 can perform additional processing to modify the rearranged input segments 150 and/or the output signal 152 prior to providing the output signal 152 to a speaker. The additional processing can include adding a period of silence between each pair of segments in the rearranged input segments 150 and/or adding fade-in and/or fade-out effects at the beginning and/or end of each of the rearranged input segments 150. The time durations of the periods of silence and/or the fade-in and fade-out effects are specified by encoding parameters 146.

As an example, the sweep signal encoder module 132 can map 5 input segments 142 having indexes "1, 2, 3, 4, 5" to five rearranged input segments 150 using the encoding key 144 [1, 4, 3, 2, 5], which specifies that the input segment having index 1 ("input segment 1") is to be mapped to a rearranged input segment having index 1 ("rearranged segment 1"), input segment 2 is to be mapped to rearranged segment 4, input segment 3 is to be mapped to rearranged segment 3, input segment 4 is to be mapped to rearranged segment 2, and input segment 5 is to be mapped to rearranged segment 5. The resulting rearranged input segments 150 are thus "1, 4, 3, 2, 5".

The sweep signal encoder module 132 generates an output signal 152 based on the rearranged input segments 150. For example, the output signal 152 can have the same frequencies as the rearranged input segments 150 in the same order as in the rearranged input segments 150. The sweep signal encoder module 132 provides the output signal 152 to a speaker 204 in an acoustic space and causes the speaker 204 to produce audio tones based on the output signal 152.

Although examples are described herein with reference to signals having increasing frequencies and signal segments successively higher frequency ranges, the techniques discussed herein can be also applied to signals having decreasing frequencies and signal segments having successively lower frequency ranges with appropriate changes.

Figure 4:
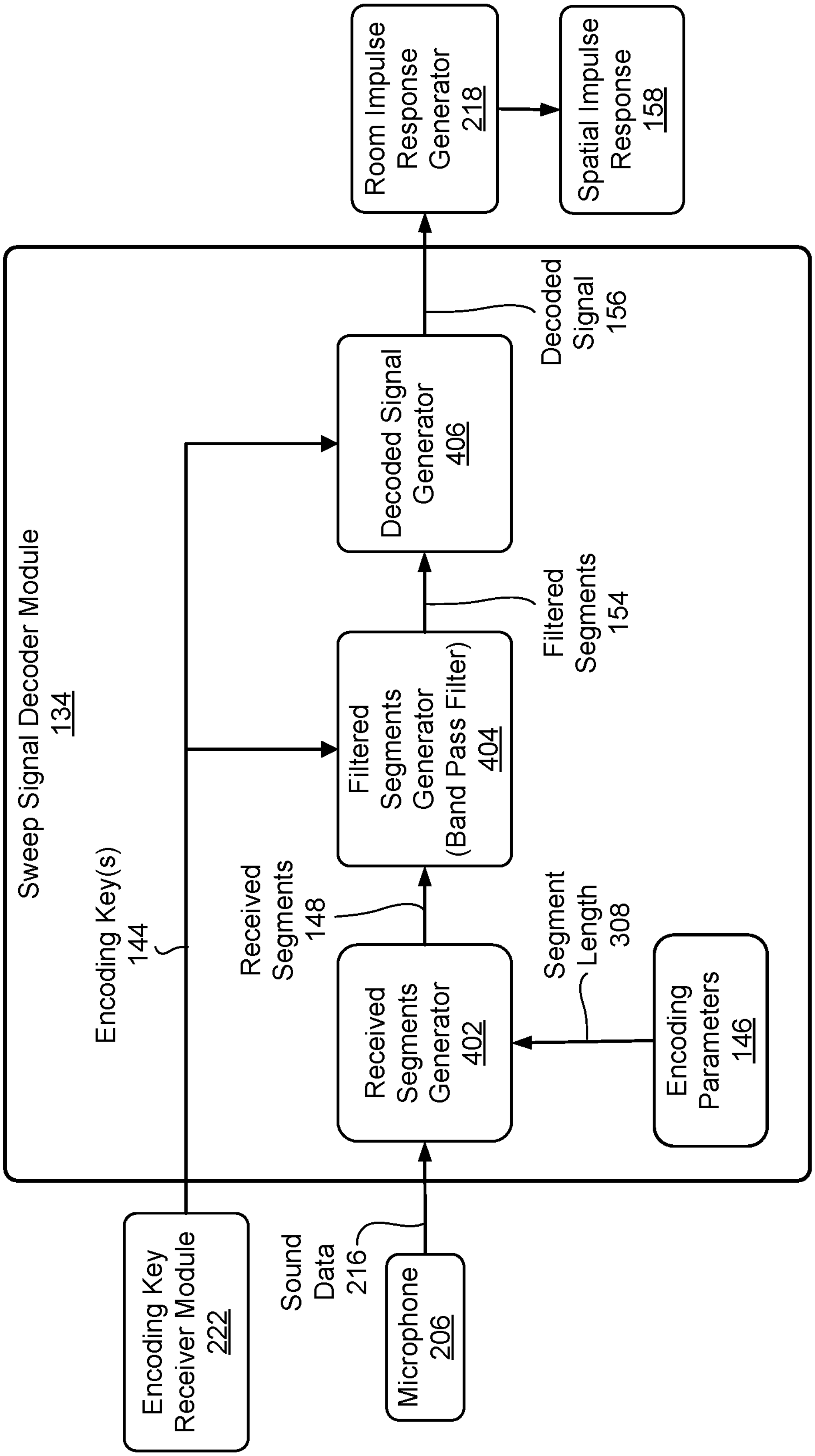
FIG. 4 is a block diagram of the sweep signal decoder module of FIG. 1, according to various embodiments.

FIG. 4 is a block diagram of the sweep signal decoder module 134 of FIG. 1, according to various embodiments. The sweep signal decoder module 134 includes a received segments generator 402, an optional filtered segments generator 404, and a decoded signal generator 406. A microphone 206 captures sound data 216, which is based on sound waves that occur in the audio space as a result of the speaker 204 producing the audio tones.

The received segments generator 402 generates an input signal (not shown) based on the captured sound data 216. To generate the input signal, the received segments generator 402 identifies a portion of a captured signal in the sound data 216 that corresponds to a portion of the output signal 152 that was provided to the speaker 204 to cause the speaker 204 to produce audio tones. As an example, with reference to FIG. 5D, the received segments generator 402 can use pattern matching to identify a portion of the captured signal that matches a given alignment bloc pattern. The pattern matching technique can identify a similarity between a portion of the captured signal and a given alignment block pattern. The location (e.g., start and/or end time) of the alignment block pattern in the captured signal identifies the location of the portion of the captured signal that corresponds to a portion of the output signal 152.

If effects such as fade-in, fade-out, and/or silence periods between the segments are present in the captured signal, the received segments generator 402 removes the effects from the captured signal. Fade-in and fade-out effects are removed by performing a reverse of the fade effect transformation performed by the effects generator 316 that modified the rearranged input segments 150 to include the fade-in and/or fade-out effects. For example, the fade-in and fade-out effects can be removed by undoing the gain scaling that was applied by the fade and silence effects generator 316. The reverse fade effect transformation can increase the amplitudes of the fade-in and/or fade-out portions of the input signal to original values the rearranged input segments 150 had prior to application of the effects by the effects generator 316. Silence effects are removed, which can be periods of silence, are removed by identifying the periods of silence between segments 142 in the input signal and moving the segments 142 together so that the segments 142 are adjacent together, A period of silence can be, e.g., a portion of a signal having a frequency that is inaudible to humans, e.g., 0 Hz or other inaudible frequency, As an example, with reference to FIG. 5D, removing fade-in effects 520 from the beginning of each segment 142, removing fade-out effects 522 from the end of each segment 142, and removing the periods of silence 524 between each pair of segments 142 from the input segment waveforms with effects 506 produces a sequence of rearranged input segments with effects 160 such as the sequence of rearranged input segments 150 shown in FIG. 5C. The received segments generator 402 then partitions the input signal into a sequence of N received segments 148. Each of the N received segments 148 represents a different frequency range. N can be specified by the encoding parameters 146 and/or determined based on a segment length 308 specified by the encoding parameters 146.

The sweep signal decoder module 134 converts the sequence of received segments 148 to a sequence of decoded segments (not shown) that are in the same order as the sequence of input segments 142 and generates a decoded signal 156 based on the sequence of decoded segments. The sweep signal decoder module 134 can convert the sequence of received segments 148 to the sequence of decoded segments using an inverse mapping operation, for example. The inverse mapping operation can map the received segments 148 to the sequence of decoded segments by selecting each of the received segments 148 in an order based on the encoding key 144. The sweep signal decoder module 134 can add (e.g., append) each selected received segment 148 to the sequence of decoded segments in the order in which the received segments 148 are selected. Each of the numbers in the encoding key 144 identifies a destination index (e.g., position) in the sequence of received segments 148 to which a segment identified by a source index in the input segments 142 is mapped. To perform the inverse mapping from the order of the received segments 148 to the order of the input segments 142, the sweep signal decoder module 134 can iterate through the segment numbers in the encoding key 144 and, for each segment number in the key, select the received segment 148 identified by the segment number and add (e.g., append) the selected received segment 148 to the sequence of decoded segments.

As an example, the received segments 148 can be "1, 4, 3, 2, 5" and the encoding key 144 can be [1 4 3 2 5]. As described above, the encoding key 144 [1 4 3 2 5] specifies that the input segment having index 1 ("input segment 1") is mapped to a rearranged input segment having index 1 ("rearranged segment 1"), input segment 2 is mapped to rearranged segment 4, input segment 3 is mapped to rearranged segment 3, input segment 4 is mapped to rearranged segment 2, and input segment 5 is mapped to rearranged segment 5. The sweep signal decoder module 134 performs the inverse mapping by iterating through the segment numbers in the encoding key 144. The first segment number in the encoding key 144 (at index=1) is 1, so the sweep signal decoder module 134 selects the received segment 148 having index=1, which is the first received segment 148 in the sequence of received segments 148 (having segment number=1). The segment number "1" is added to the sequence of decoded segments.

Moving to the next segment number in the encoding key 144, the second segment number in the encoding key 144 (at index=2) is 4, so the sweep signal decoder module 134 selects the received segment 148 having index=4, which is the fourth received segment 148 in the sequence of received segments 148 (having segment number=2). The segment number "2" is added to the sequence of decoded segments. The sweep signal decoder module 134 continues by iterating through the third, fourth, and fifth segment numbers in the encoding key 144, and selecting the respective received segments 148 having indexes 3, 2, and 5, which have segment numbers 3, 4, and 5, respectively. The resulting sequence of decoded segments is "1, 2, 3, 2, 5", which is the same order the input segments 142 had prior to being rearranged. The sweep signal decoder module 134 generates a decoded signal 156 based on the sequence of decoded segments and determines a spatial impulse response 158 using the decoded signal 156.

The sweep signal decoder module 134 can be located on the same computing device 100 as the sweep signal encoder module 132, in which case the sweep signal decoder module 134 can access the encoding key 144 and the value of N via shared memory or otherwise receive the encoding key 144 and/or the value of N from the sweep signal encoder module 132. Alternatively or additionally, the sweep signal decoder module 134 can be located on a different computing device than the sweep signal encoder module 132, in which case the sweep signal encoder module 132 can send the encoding key 144 and/or the value of N to the sweep signal decoder module 134 on the different computing device via network communication. As another alternative, the encoding key 144 and/or the value of N can be provided to the different computing device in the encoding parameters 146 when the audio system is configured, for example.

The sound waves that occur in the audio space as a result of the audio produced by the speaker include reverberations of the audio tones, and the reverberations continue for some time after the segments of the audio tones are produced. When the sequence of received segments 148 is decoded to form the sequence of decoded segments for the decoded signal 156, portions of the reverberation tails from other segments that are included in the received segments 148 are moved as part of the segments that are moved during the re-ordering of the received segments 148 to form the decoded signal 156. The generated reordered signal accordingly has segments that contain portions of tails from previous segments that are out of order.

An optional filtered segments generator 404 can receive the sequence of received segments 148 and use a band pass filter to remove copies of the reverberation tails of segments that are not in the same order as the original signal before re-ordering the received segments 148 to form the decoded signal 156. The filtered segments generator 404 generates a sequence of filtered segments 154. In some embodiments, the reverberation tails of segments are reordered with the segments after removing frequencies outside the expected frequency ranges of the segments, so the reordered segments include the reverberation tails. With reference to FIGS. 5F and 5G, if the filtered segments generator 404 (which includes a band pass filter) is not used, and the received segments 148 are passed to the decoded signal generator 406, the decoded signal generator 406 moves vertical slices of the signal that can include portions of reverberation tails 504 of other segments 502. For example, if the filtered segments generator 404 is not used, a received segment 502D is moved from the time range between T2 and T3 to the time range between T4 and T5 by moving the vertical slice of the signal. As a result, a portion of the reverberation tail 504D is not moved and is in the resulting signal at an earlier time than the segment 504D that caused the reverberation tail. The respective reverberation tails 504 that correspond to respective segments 502 can be retained during the reordering by using the filtered segments generator 404, which includes a band pass filter that removes the reverberation tails of other segments (e.g., 504D) from each segment (e.g., the segment between T3 and T4). Further, the filtered segments generator 404 can remove the reverberation tail portions (e.g., 504C) of other segments in the same slice as a segment (e.g., 502B) when moving a vertical slice (e.g., the slice between T4 and T5 to the time segment between T2 and T3). Using the filtered segments generator 404, the resulting decoded signal 156 shown in FIG. 5I has preserved reverberation tails 504. The decoded signal 156 produced when the filtered segments generator 404 is used results in improved room impulse response results. For example, when the longer reverberation tail is preserved using the decoded signal 156 produced based on the results of the filtered segments generator 404, wall distance estimates determined using the decoded signal 156 are accurate for up to approximately twice the distance from the computing device 100 to the wall compared to a decoded signal 156 produced without using the band pass filtering performed by the filtered segments generator 404.

The band pass filter(s) used by the filtered segments generator 404 convert the received segments 148 to filtered segments 154, and the sweep signal decoder module 134 can generate the decoded signal 156 based on the filtered segments 154, which are in an order that corresponds to the sequence of input segments 142, by performing an inverse mapping using the encoding key 144. A decoded signal generator 406 can receive the filtered segments 154 and generate a decoded signal 156 based on the filtered segments 154. The decoded signal generator 406 can use an encoding key 144 received from an encoding key receiver module 222 by selecting each of the N filtered segments in an order based on the sequence of the non-consecutive numbers in the encoding key. The decoded signal 156 is provided as input to a spatial impulse response generator 218, which generates a spatial impulse response 158 based on the decoded signal 156.

Figure 5A:
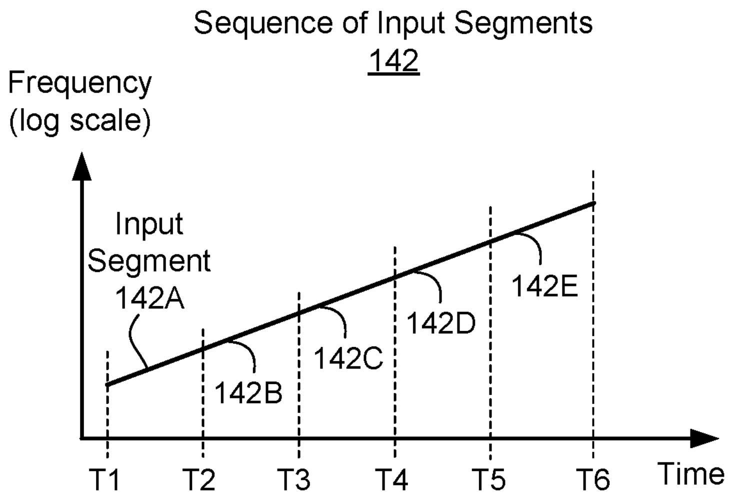
FIG. 5A illustrates a frequency sweep signal partitioned into input segments, according to various embodiments.

FIG. 5A illustrates a frequency sweep signal partitioned into input segments 142, according to various embodiments. The frequency sweep signal includes a sequence of input segments 142, which includes input segments 142A, 142B, 142C, 142D, 142E. As shown, the frequency of the sequence of input segments 142 increases linearly on a logarithmic frequency scale over time. The length of each input segment 142A-E is specified by a segment length 308. For example, the input segment 142A begins at time T1 and ends at time T2. The difference between times T2 and T1 is the segment length 308. The input segment 142B extends from time T2 to time T3. The input segment 142C extends from time T3 to time T4. The input segment 142D extends from time T4 to time T5. The input segment 142E extends from time T5 to time T6.

Figure 5B:
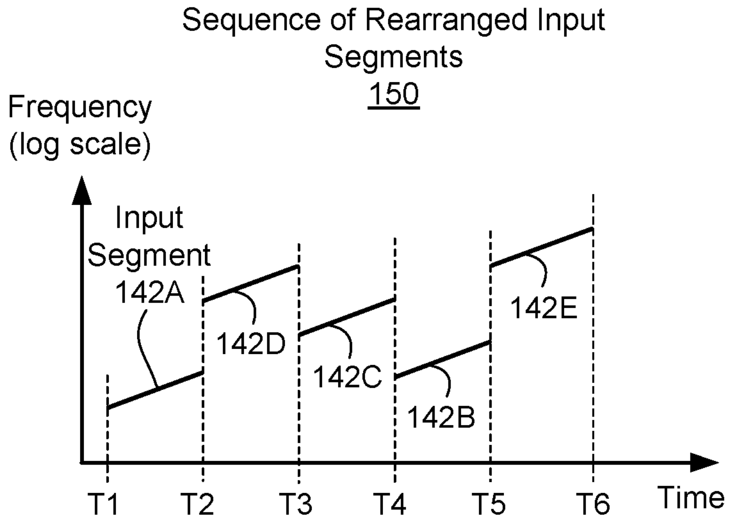
FIG. 5B illustrates an output signal that includes a sequence of rearranged input segments, according to various embodiments.

FIG. 5B illustrates an output signal that includes a sequence of rearranged input segments 150, according to various embodiments. The sequence of rearranged segments 150 is generated by permuting the sequence of input segments 142 of FIG. 5A using an encoding key 144 of [1 4 3 2 5]. The rearranged input segments 150 is generated by the rearranged segments generator 312 of FIG. 3. As can be seen in FIG. 5B, input segment 142A is in a first time range between T1 and T2. Input segment 142A is also in the first time range in FIG. 5A, as specified by the number "1" in the first element of the encoding key 144.

Segment 142D (a fourth segment) has moved from a fourth time range (between T3 and T4) to a second time range between T2 and T3, as specified by the number "4" in the encoding key 144. Input segment 142C (a third segment) has not moved and is in the third time range (between T4 and T4 in FIG. 5A and between T3 and T4 in FIG. 5B), as specified by the number "3" in the encoding key 144. Input segment 142B (a second segment) has moved from the second time range (between T2 and T3) to the fourth time range (between T4 and T5). Input segment 142E (a fifth segment) has not moved and is still in the fifth time range (between T5 and T6), as specified by the number "5" in the encoding key 144.

Figure 5C:
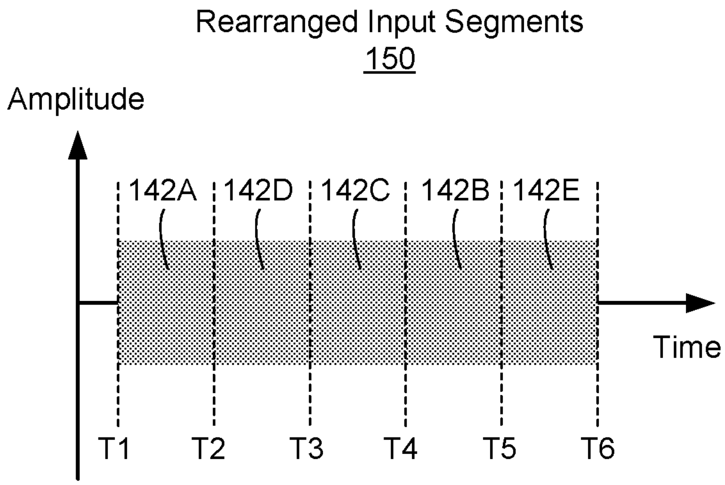
FIG. 5C illustrates a waveform view of a sequence of rearranged input segments, according to various embodiments.

FIG. 5C illustrates a waveform view of a sequence of rearranged input segments 150, according to various embodiments. In the waveform view, the x axis represents time and the y axis represents amplitude of the frequency sweep signal. The frequency sweep signal is partitioned into input segments 142. The input segments 142 have been rearranged and are in the order shown in FIG. 5B. The signal can be an exponential sine sweep signal in which the frequency increases over time. The exponential sine sweep signal is a sine wave that appears as a rectangle because of the scale used in FIG. 5C, in which the individual waves are not visibly discernable. Input segment 142A is shown as a rectangle between times T1 and T2. Similarly, segment 142D is between T2 and T3, segment 142C is between T3 and T4, segment 142B is between T4 and T5, and segment 142E is between segment T5 and T6.

Figure 5D:
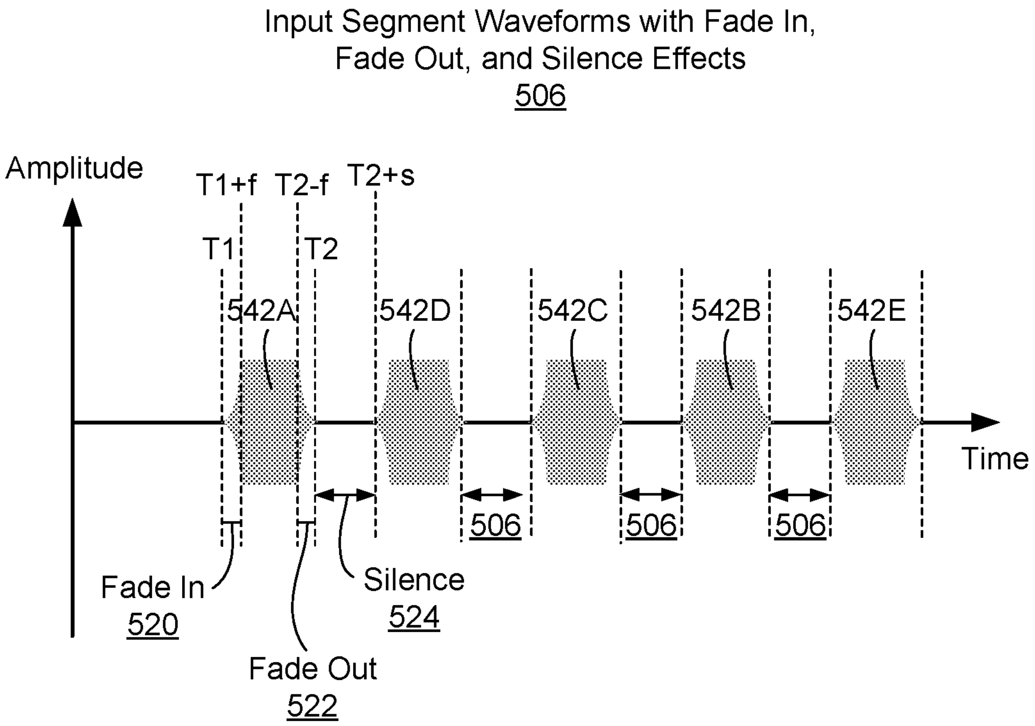
FIG. 5D illustrates a waveform view of a sequence of rearranged input segments having effects, according to various embodiments.

FIG. 5D illustrates a waveform view of a sequence of rearranged input segments with effects 506, according to various embodiments. The input segment waveforms with effects 506 includes waveform representations of modified input segments 542A, 542B, 542C, 542D, and 542E. The fade and silence effects generator 316 generates the input segment waveforms with effects 506 by applying fade-in, fade-out, and silence period effects to the rearranged input segments 502. The fade-in effect modifies the amplitude of an initial portion of each input segment 142 to gradually increase from an initial value, such as 0 dB, to an amplitude A over a period of time specified by a fade-in length. The modified input segment begins at a time T1 and ends at a time T2. A fade-in effect 520 is an initial portion of the modified input segment 542A. The fade-in effect 520 begins at time T1 and ends at time T1+f, where f is the fade-in length.

The fade-out effect modifies the amplitude of a trailing portion of each input segment to gradually decrease from the amplitude A to the initial value (e.g., 0 dB) over a period of time specified by a fade-out length. A fade-out effect 522 is a trailing portion of the modified input segment 542A. The fade-out effect 522 begins at time T2-f and ends at time T2, where is the fade-out length, which is equal to the fade-in length in this example. The fade-out length can be, for example, 25% of the segment length 308. The silence period effect applied by the fade and silence effects generator 316 inserts a period of silence of a predefined silence length s between each pair of adjacent input segments 542 in the sequence of rearranged input segments 150 to form a sequence of rearranged input segments with effects 160 in which the input segments are spaced apart by a period of silence 524, and each segment has a fade-in effect 520 and a fade-out effect 522.

Figure 5E:
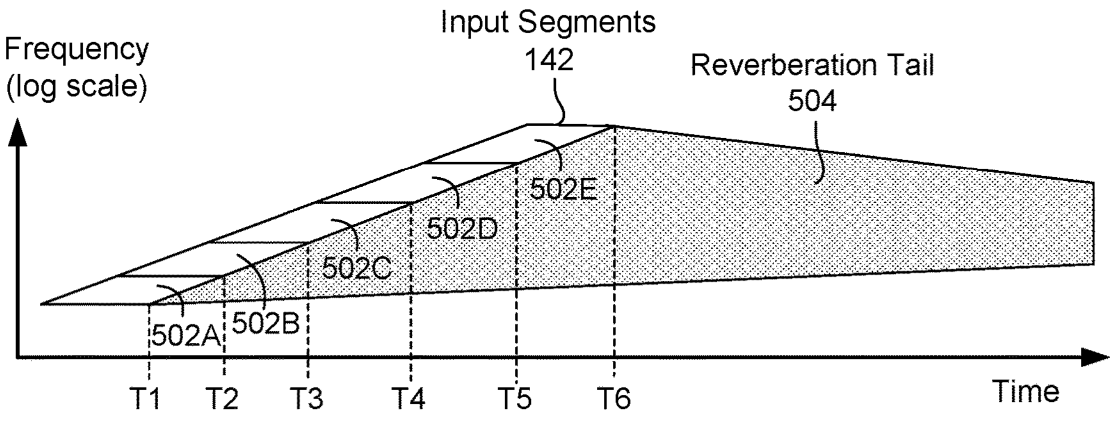
FIG. 5E illustrates a spectrogram view of a frequency sweep signal partitioned into input segments, according to various embodiments.
Figure 5F:
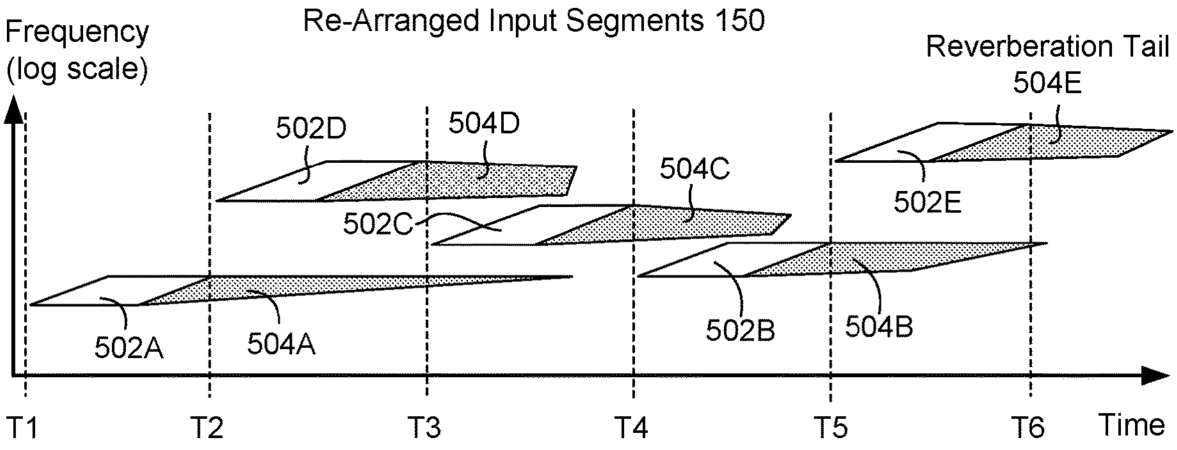
FIG. 5F illustrates a spectrogram view of an output signal that incudes rearranged input segments, according to various embodiments.
Figure 5G:
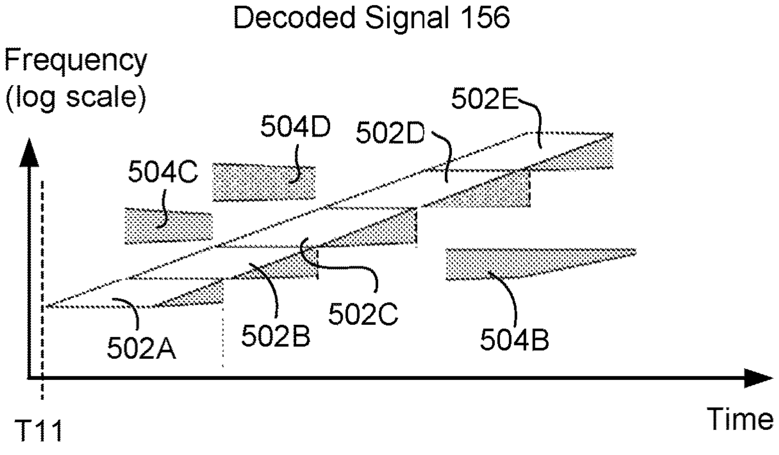
FIG. 5G illustrates a spectrogram view of a decoded signal that includes received segments in a decoded order determined based on an encoding key, according to various embodiments.

FIG. 5E illustrates a spectrogram view of a frequency sweep signal partitioned into input segments, according to various embodiments. The frequency sweep signal includes a sequence of input segments 142. The sequence of input segments 142 includes input segments 502A-502E, each of which has a start time and an end time. The sequence of input segments 142 is generated by the input segments generator 310 of FIG. 3. The first input segment 502A extends from time T1 to time T2. A second input segment 502B extends from time T2 to time T3. A third input segment 502C extends from time T3 to time T4. A fourth input segment 502D extends from time T4 to time T5. A fifth input segment 502E extends from time T5 to time T6. The frequency sweep signal is increasing in frequency over time and includes a reverberation tail 504.

FIG. 5F illustrates spectrogram view of an output signal that includes a sequence of rearranged input segments 150, according to various embodiments. The individual rearranged segments 502A-502E shown in FIG. 5F are the same segments shown in FIG. 5E but are in a different order. The sequence of rearranged segments 150 is generated by permuting the sequence of segments 142 of FIG. 5E using an encoding key 144 of [1 4 3 2 5]. The sequence of rearranged input segments 150 is generated by the rearranged segments generator 312 of FIG. 3.

As can be seen in FIG. 5F, segment 502A is in the first time range between T1 and T2. Segment 502A is also in the first time range in FIG. 5E, as specified by the number "1" in the first element of the encoding key 144. Segment 502A has a reverberation tail 504A. Segment 502D (a fourth segment) has moved from a fourth time range (between T4 and T5) to a second time range between T2 and T3, as specified by the number "4" in the encoding key 144. Segment 502D has a reverberation tail 504D. Segment 502C (a third segment) has not moved and is in the third time range (between T4 and T4 in FIG. 5E and between T3 and T4 in FIG. 5F), as specified by the number "3" in the encoding key 144. Segment 502C has a reverberation tail 504C. Segment 502B (a second segment) has moved from the second time range (between T2 and T3) to the fourth time range (between T4 and T5). Segment 502B has a reverberation tail 504B. Segment 502E (a fifth segment) has not moved and is still in the fifth time range (between T5 and T6). Segment 502E has a reverberation tail 504E.

FIG. 5G illustrates a spectrogram view of a decoded signal that includes received segments 502 in a decoded order determined based on an encoding key, according to various embodiments. The segments 502 have been moved along the horizontal (time) axis to their original order, from segment 502A through segment 502E. As a result of moving the segments 502 to different locations along the time axis, some portions of the reverberation tails 504 are located earlier in time than the segments 502 of the corresponding received sweep signals. For example, a tail portion 504C has been moved to a time earlier than the segment 502C. These anti-causal results occur because portions of the signal at frequencies above a particular segment 502, such as the frequencies of the reverberation tail 504C, are moved as part of a vertical slice of the graph when the re-arranged input segments 150 segments are re-arranged to their original order to form the decoded signal 156. For example, the slice between T4 and T5 (shown in FIG. 5F) includes reverberation tail 504C. The slice was moved to the time range between T2 and T3 to form the graph shown in FIG. 5G, thereby moving a portion of the tail 504C to the time range between T2 and T3, which is earlier in time than the segment 502C. However, the segment 502C precedes the tail 504C because the segment 502C caused the reverberations represented by the tail 504C. As another example, an anti-causal reverberation tail 504D occurs earlier in time than the segment 502D. These anti-causal reverberation tails 504C, 504D can be removed using a band pass filter that attenuates frequencies above and below each segment 502 and corresponding reverberation tail 504 as described herein.

Figure 5H:
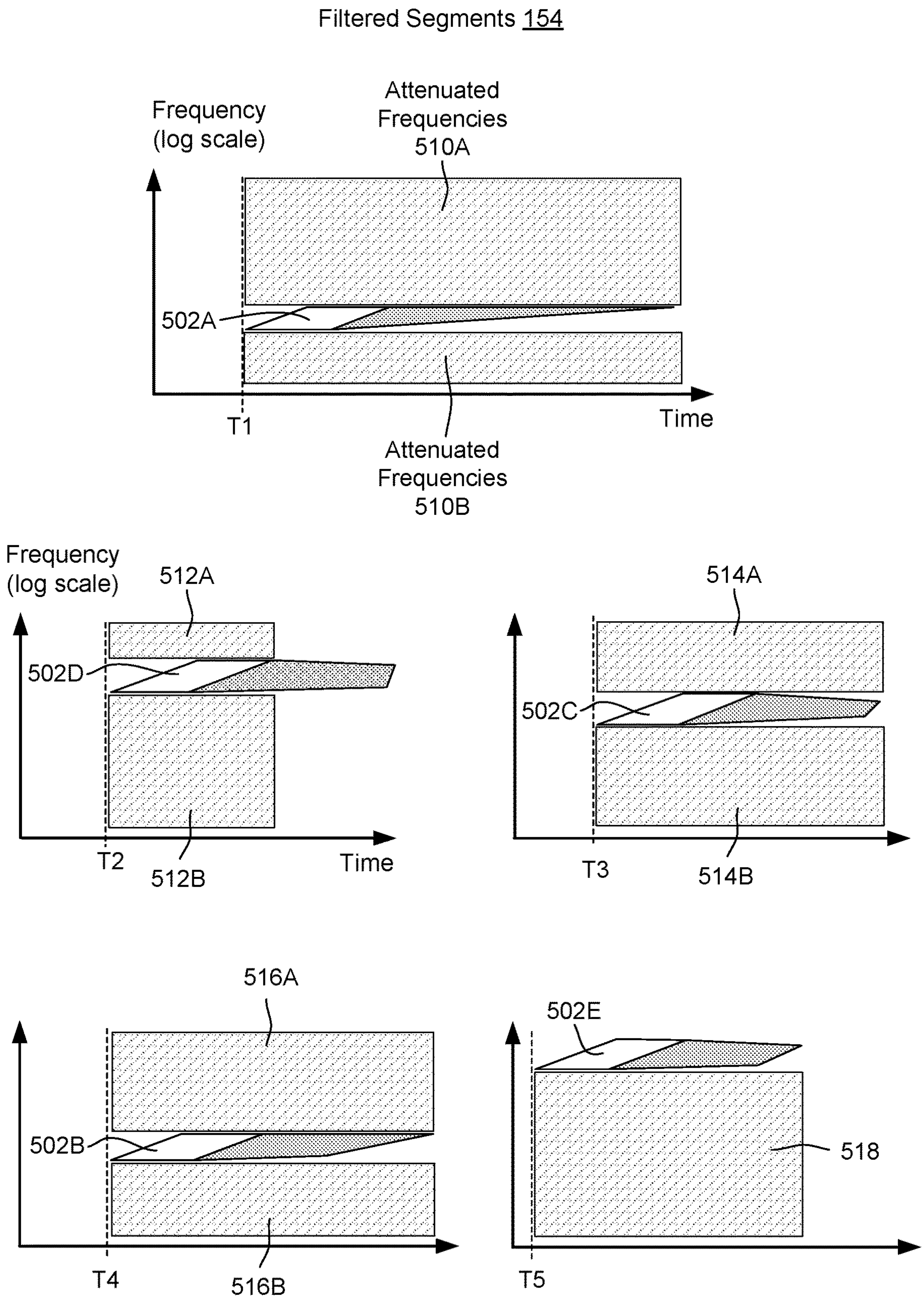
FIG. 5H illustrates spectrogram views of filtered segments generated from captured sound data using band pass filtering, according to various embodiments.

FIG. 5H illustrates spectrogram views of a filtered segments 502 generated from captured sound data using band pass filtering, according to various embodiments. Each segment 502 is shown on a separate graph for clarity. A first segment 502A starts at time T1 and extends along the time axis to the end of the reverberation tail. A band pass filter is shown as a rectangular regions 510A, which attenuates frequencies above the first segment 502A, and a rectangular region 510B, which attenuates frequencies below the first segment 502A. The band pass filter removes the other segments 502B-502E and their corresponding tails 504B-504E. Similarly, the frequencies above and below segment 502D starting at time T2 have been removed by a band pass filter shown as rectangular regions 512A and 512B.

Further, the frequencies above and below segment 502C starting at time T3 have been removed by a band pass filter shown as rectangular regions 514A and 514B. The frequencies above and below segment 502B starting at time T4 have been removed by a band pass filter shown as rectangular regions 516A and 516B. The frequencies below segment 502E starting at time T5 have been removed by a band pass filter shown as a rectangular region 518.

Figure 5I:
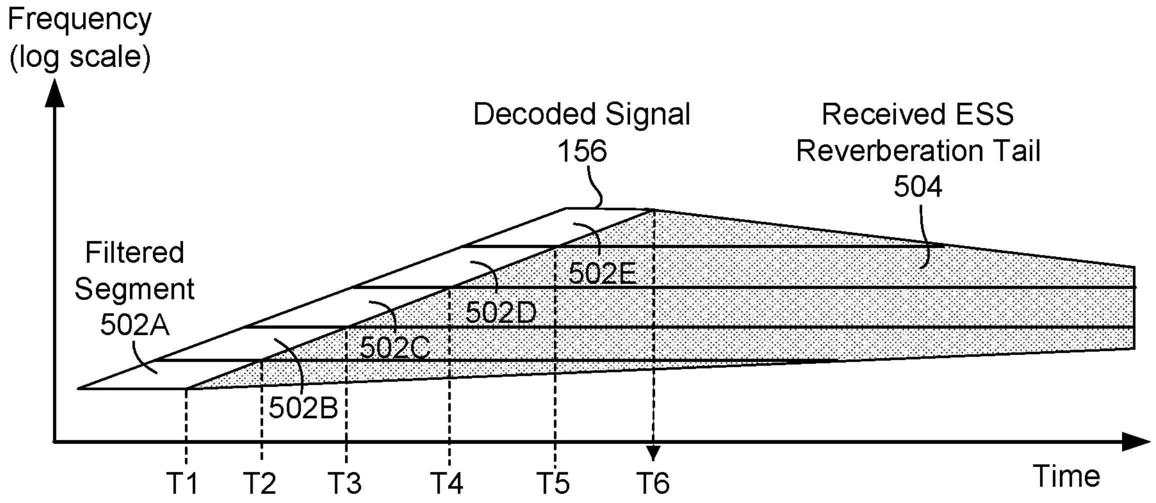
FIG. 5I illustrates a spectrogram view of a decoded signal that includes filtered segments in a decoded order determined based on an encoding key, according to various embodiments.

FIG. 5I illustrates a spectrogram view of a decoded signal 156 that includes filtered segments 502A-502E in a decoded order determined based on an encoding key, according to various embodiments. The encoding key is [1 4 3 2 5] in this example. The decoding key has been used to reorder the segments 502 so that they are in a decoded order. Segment 502A is at time T1, segment 502B has been moved to time T2, segment 502C is at time T3, segment 502D has been moved to time T4, and segment 502E is at time T5. The reverberation tails 504 that correspond to the segments 502 are retained during the reordering because the band pass filters shown in FIG. 5I preserve the reverberation tails 504 with their corresponding segments 502.

Figure 6:
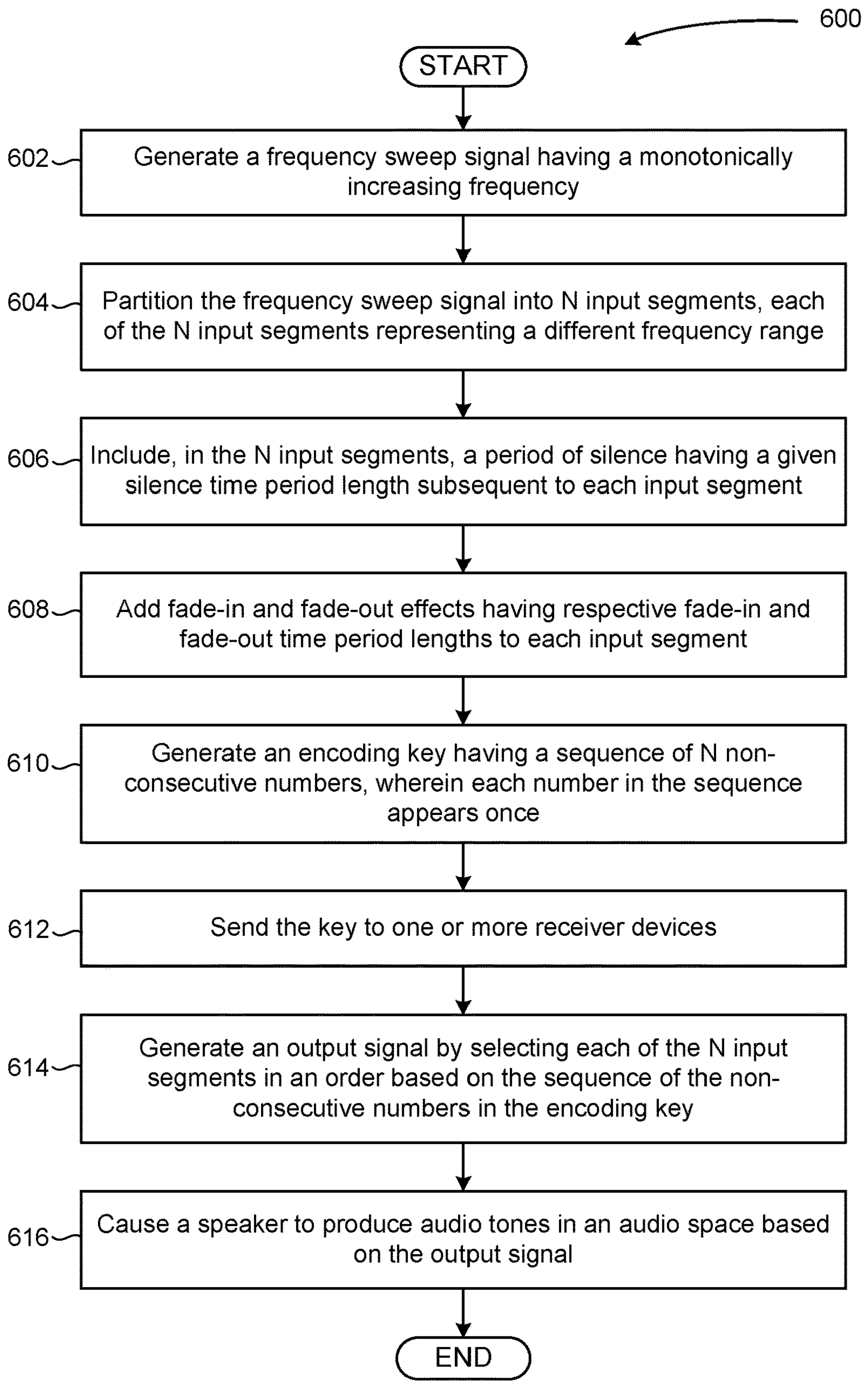
FIG. 6 is a flow diagram of method steps for generating a modified frequency sweep signal having segments in an order determined based on an encoding key, according to various embodiments.

FIG. 6 is a flow diagram of method steps for generating a modified frequency sweep signal having segments in an order determined based on an encoding key, according to various embodiments. Although the method steps are described in conjunction with the systems of FIGS. 1-5I, persons skilled in the art will understand that any system configured to perform the method steps, in any order, is within the scope of the present disclosure.

As shown, a method 600 begins at step 602, where a computing device 100 generates a frequency sweep signal having a monotonically increasing frequency. The frequency sweep signal can be, for example, an exponential sine sweep signal in which the frequency of the signal is monotonically increasing over time.

At step 604, computing device 100 partitions the frequency sweep signal into N input segments, each of which represents a different frequency range. Each input segment has a segment length 308. For example, if the frequency sweep signal increases in frequency over time from 1 kHz to 6 kHz, and there are 5 pulses, the first pulse is 1-2 kHz, the second is 2-3 kHz, the third is 3-4 kHz, the fourth is 4-5 kHz, and the fifth is 5-6 kHz. An example frequency sweep signal partitioned into input segments 142A-142E is shown in FIG. 5A.

At step 606, computing device 100 optionally includes, in the N input segments, a period of silence having a given silence time period length subsequent to each input segment. Step 606 can apply a silence effect to the sequence of input segments 142 as described herein with reference to FIG. 3. The period of silence inserted into the frequency sweep signal between each pair of adjacent segments can facilitate the identification of the individual segments in a signal received by a microphone, e.g., by step 706 of the flowchart of FIG. 7.

At step 608, computing device 100 adds fade-in and fade-out effects having respective fade-in and fade-out time period lengths to each input segment. The fade-in and fade-out effects are applied to the input segments to prevent implosive sounds at the speaker 204 when step 616 causes the speaker to produce audio based on an output signal 152 that is based on the input segments 142. The computing device 100 can use gain scaling to apply the fade-in effect to each input segment of the frequency sweep signal over a time period that is specified by the fade-in length and starts at the beginning of each input segment. The fade-in length can be a parameter, e.g., a predetermined value such as 25% of the segment length 308. Applying the fade-in effect modifies the amplitude of an initial portion of each input segment to gradually increase from an initial value, such as 0 dB, to an amplitude of the frequency sweep signal that is generated step 602. The computing device 100 can also use gain scaling to apply the fade-out effect to of a trailing portion of each input segment of the frequency sweep signal over a time period that is specified by the fade-out length and ends at the end of each input segment. Applying the fade-out effect decreases the amplitude A to the initial value (e.g., 0 dB) over a period of time specified by a fade-out length parameter.

At step 610, computing device 100 generates an encoding key having a sequence of N non-consecutive numbers, wherein each number in the sequence appears once. The encoding key can be generated based on random numbers, so that different encoding keys are used at different times. As an example, to generate the encoding key 144, at step 610 the computing device 100 initializes the encoding key 144 to an empty sequence and generates a sequence of available numbers that initially includes the numbers 2 through N−1. The computing device 100 randomly selects an available number from the sequence of available numbers, adds (e.g., appends) the randomly selected available number to the encoding key 144, and removes the randomly selected available number from the sequence of available numbers. The computing device 100 then identifies the available numbers, if any, that are in the sequence of available numbers and are non-consecutive with the number at the end of the encoding key. If there are no available numbers, then the computing device 100 randomly selects a different available number from the sequence of available numbers. Otherwise, the computing device 100 adds the available number to the encoding key 144 and removes the available number from the sequence of available numbers. The computing device 100 repeatedly performs the above operations until the encoding key 144 includes each number in the range 2 through N−1.

At step 612, computing device 100 sends the key to one or more receiver devices. The key can be sent to the receiver devices via a communications network, for example. At step 614, computing device 100 generates an output signal 152 by selecting each of the N input segments in an order based on the sequence of the non-consecutive numbers in the encoding key. To generate the output signal 152, the computing device 100 can generate a rearranged sequence of the N input segments, in which each input segment has a respective second position in the rearranged sequence, and the respective second position is based on a respective number in the sequence of N non-consecutive numbers. Further, the respective number has a position in the sequence of N non-consecutive numbers that corresponds to the first position of the input segment in the N input segments, and the output signal 152 is based on the rearranged sequence. The position of the respective number in the sequence of N non-consecutive numbers is determined based on the first position of the input segment in the N input segments. At step 616, computing device 100 causes a speaker to produce audio tones in an audio space based on the output signal 152.

Figure 7:
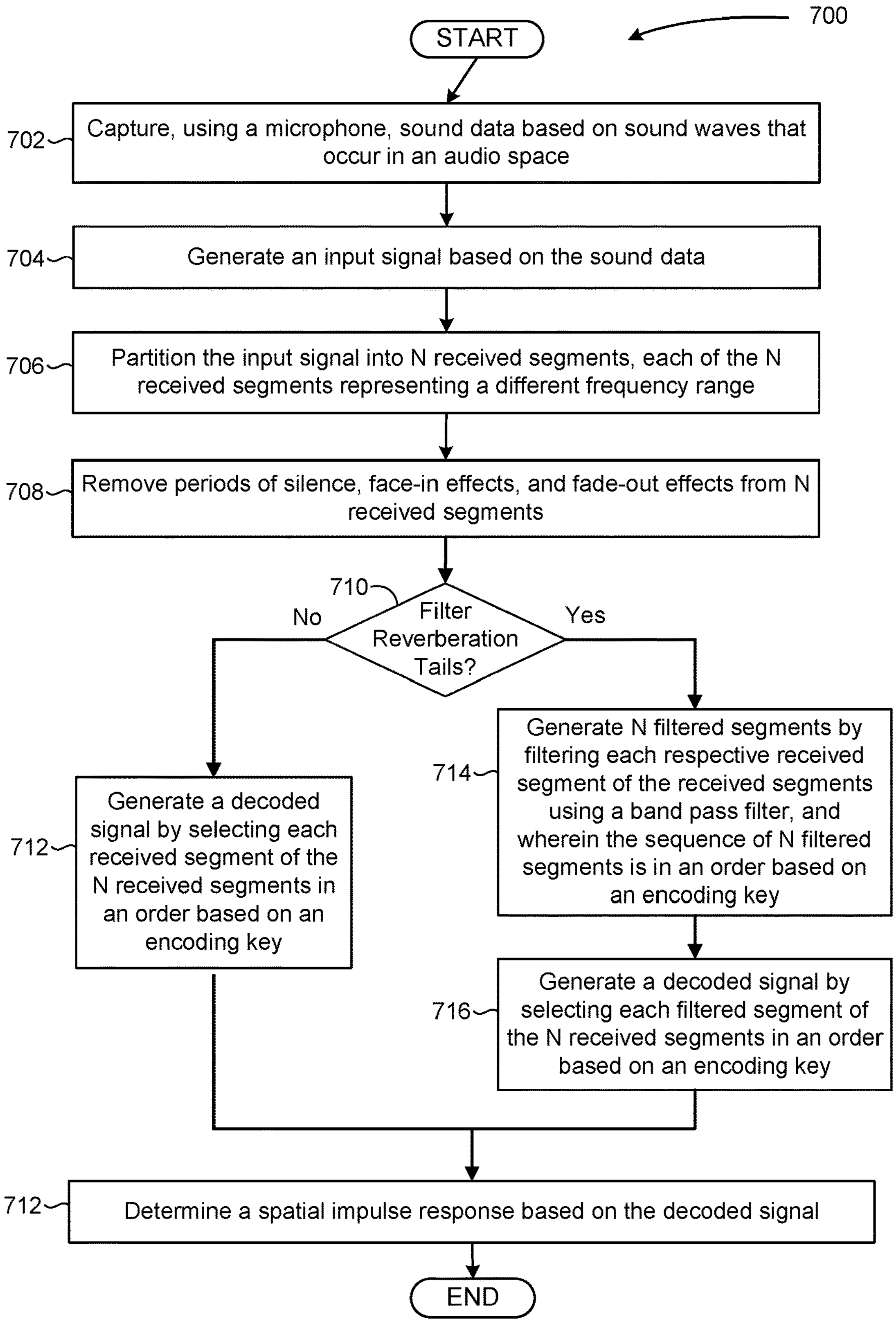
FIG. 7 is a flow diagram of method steps for decoding a modified frequency sweep signal and determining a spatial impulse response based on the decoded signal, according to various embodiments.

FIG. 7 is a flow diagram of method steps for decoding a modified frequency sweep signal and determining a spatial impulse response based on the decoded signal, according to various embodiments. Although the method steps are described in conjunction with the systems of FIGS. 1-5I, persons skilled in the art will understand that any system configured to perform the method steps, in any order, is within the scope of the present disclosure.

As shown, a method 700 begins at step 702, where a computing device 100 captures, using a microphone, sound data based on sound waves that occur in an audio space. The sound waves occur as a result of audio tones produced by a speaker in the audio space based on an output signal 152 such as that generated at step 616 of FIG. 6.

At step 704, computing device 100 generates an input signal based on the sound data. For example, with reference to FIG. 5D, the received segments generator 402 can use pattern matching to identify a portion of the captured signal that matches a given alignment bloc pattern. The pattern matching technique can identify a similarity between a portion of the captured signal and a given alignment block pattern. The location (e.g., start and/or end time) of the alignment block pattern in the captured signal identifies the location of the portion of the captured signal that corresponds to a portion of the output signal 152.

At step 706, computing device 100 partitions the input signal into N received segments, each of the N received segments representing a different frequency range. N can be specified by the encoding parameters 146 and/or determined based on a segment length 308 specified by the encoding parameters 146.

At step 708 computing device 100 removes periods of silence, face-in effects, and fade-out effects from N received segments. If effects such as fade-in, fade-out, and/or silence periods between the segments are present in the captured signal, the received segments generator 402 removes the effects from the captured signal as described herein with respect to FIG. 4.

At step 710, computing device 100 determines whether reverberation tail filtering is to be performed. Reverberation tail filtering optional and is performed if, for example, a corresponding configuration option for reverberation tail filtering is enabled.

If step 710 determines that reverberation tail filtering is not to be performed, then at step 712, computing device 100 generates a decoded signal by selecting each received segment of the N received segments in an order based on an encoding key. The encoding key can be received from a sender device, for example.

If step 710 determines that reverberation tail filtering is to be performed, then at step 714, computing device 100 generates N filtered segments by filtering each respective received segment of the received segments using a band pass filter, and wherein the sequence of N filtered segments is in an order based on an encoding key, and at step 716, computing device 100 generates a decoded signal by selecting each filtered segment of the N received segments in an order based on an encoding key. The encoding key 144 specifies the order in which the input segments 142 are selected. The selection order is specified as a sequence of segment numbers that identify segments in the input segments 142.

To generate the decoded signal by selecting each received segment, computing device can generate N filtered segments, where each filtered segment is generated by filtering each respective received segment of the received segments using a band pass filter. The decoded signal is generated by selecting each of the N filtered segments in an order based on the sequence of the non-consecutive numbers in the encoding key. At step 712, computing device 100 determines a spatial impulse response based on the decoded signal using a suitable technique.

In sum, a computer-based audio system generates a room impulse response by converting a given signal (e.g., a frequency sweep signal or exponential sine sweep) into a modified signal in which the segments from the given signal are in a different order than in the given signal. The modified signal is then used instead of the given signal to determine an RIR. To generate an RIR, the audio system causes a speaker in an acoustic space to produce audio tones based on the modified signal. A microphone in the acoustic space captures sound data based on sound waves that occur in a room in response to the audio tones produced by the speaker. The audio system then identifies the segments in the captured sound data and generates a reordered signal in which the segments are in the same order as in the original given signal. The RIR is then determined from the given signal and the reordered signal. The sound waves include reverberations of the audio tones, and the reverberations continue for some time after the segments of the modified signal that cause the reverberations. To remove copies of the reverberation tails of received segments that are not in the same order as the original signal, each segment is band pass filtered before being reordered into the reordered signal. In some embodiments, frequencies outside the expected frequency ranges of the received segments are removed by band pass filters and the reverberation tails are preserved during the reordering of the received segments so that the decoded signal contains the reverberation tails.

At least one technical advantage of the disclosed techniques relative to the prior art is that, with the disclosed techniques, a room impulse response can be determined using a test audio signal that is less disturbing to human listeners than the test audio signals of prior art techniques. The test audio signal of the disclosed techniques is also more pleasant to human listeners than the test audio signals of prior art techniques. The test audio signal of the disclosed techniques can also be mixed with other sounds such as music to further reduce the disruptiveness of the test audio signal. Further, frequencies outside the expected frequency ranges of the received segments are removed by band pass filters and the reverberation tails are preserved during the reordering of the received segments so that the decoded signal contains the reverberation tails substantially improves the distance range for which accurate wall distance estimates are obtained compared to calculating the wall distance estimates without preserving the reverberation tails. These technical advantages represent one or more technological improvements over prior art approaches.

1. In some embodiments, a computer-implemented method for generating a signal for measuring a spatial impulse response comprises: generating a frequency sweep signal having a monotonically increasing frequency; partitioning the frequency sweep signal into N input segments, each of the N input segments representing a different frequency range; generating an encoding key having a sequence of N non-consecutive numbers, wherein each number in the sequence appears once; generating an output signal by selecting each of the N input segments in an order based on the sequence of N non-consecutive numbers in the encoding key; and causing a speaker to produce audio tones in an audio space based on the output signal.

2. The method of clause 1, wherein each input segment in the N input segments is associated with a respective first position of the input segment in the N input segments, and wherein generating the output signal comprises: generating a rearranged sequence of the N input segments, wherein each input segment has a respective second position in the rearranged sequence, and the respective second position is based on a respective position of a number corresponding to the respective first position in the sequence of N non-consecutive numbers, wherein the output signal is based on the rearranged sequence.

3. The method of clause 1 or clause 2, wherein the output signal has a discontinuity in frequency at a boundary between a first output signal segment that corresponds to a first one of the N input segments and a second output signal segment that corresponds to a second one of the N input segments that is adjacent to the first output signal segment.

4. The method of any of clauses 1-3, wherein the output signal includes at least one segment having a lower frequency range than a frequency range of a previous segment of the output signal.

5. The method of any of clauses 1-4, wherein N is based on a length of the frequency sweep signal and a predetermined length of each input segment.

6. The method of any of clauses 1-5, wherein generating the output signal comprises: including, in the output signal, a period of silence of a given length between each pair of adjacent input segments.

7. The method of any of clauses 1-6, and wherein generating the output signal comprises one or more of: converting, in each segment of the N input segments, a beginning fade-in portion of the segment to a fade-in portion having an amplitude that increases over a period of time, or converting, in each segment of the N input segments, a portion of the segment that ends at an end of the segment to a fade-out portion having an amplitude that decreases over a period of time.

8. The method of any of clauses 1-7, further comprising: capturing, using a microphone, sound data based on sound waves that occur in the audio space; generating an input signal based on the sound data; partitioning the input signal into N received segments, each of the N received segments representing a different frequency range; generating a decoded signal by selecting each received segment of the N received segments in an order based on the sequence of N non-consecutive numbers in the encoding key, the decoded signal having a monotonically increasing frequency; and determining a spatial impulse response based on the decoded signal.

9. The method of any of clauses 1-8, further comprising filtering each received segment with a band pass filter having a frequency range based on the frequency range of the received segment.

10. The method of any of clauses 1-9, further comprising removing a fade-in portion and a fade-out portion of each received segment in the N received segments.

11. One or more non-transitory computer-readable media storing program instructions that, when executed by one or more processors, cause the one or more processors to perform steps of: generating a frequency sweep signal having a monotonically increasing frequency; partitioning the frequency sweep signal into N input segments, each of the N input segments representing a different frequency range; generating an encoding key having a sequence of N non-consecutive numbers, wherein each number in the sequence appears once; generating an output signal by selecting each of the N input segments in an order based on the sequence of N non-consecutive numbers in the encoding key; and causing a speaker to produce audio tones in an audio space based on the output signal.

12. The one or more non-transitory computer-readable media of clause 11, wherein each input segment in the N input segments is associated with a respective first position of the input segment in the N input segments, and wherein generating the output signal comprises: generating a rearranged sequence of the N input segments, wherein each input segment has a respective second position in the rearranged sequence, and the respective second position is based on a respective position of a number corresponding to the respective first position in the sequence of N non-consecutive numbers, wherein the output signal is based on the rearranged sequence.

13. The one or more non-transitory computer-readable media of clause 11 or clause 12, wherein the output signal has a discontinuity in frequency at a boundary between a first output signal segment that corresponds to a first one of the N input segments and a second output signal segment that corresponds to a second one of the N input segments that is adjacent to the first output signal segment.

14. The one or more non-transitory computer-readable media of any of clauses 11-13, wherein the encoding key is further based on at least one random value.

15. The one or more non-transitory computer-readable media of any of clauses 11-14, the steps further comprising sending the encoding key and one or more input segment lengths to one or more receiver devices, wherein each input segment length indicates a length of an input segment in the N input segments.

16. A system, comprising: one or more memories storing instructions; and one or more processors coupled to the one or more memories and, when executing the instructions: generate a frequency sweep signal having a monotonically increasing frequency; partition the frequency sweep signal into N input segments, each of the N input segments representing a different frequency range; generate an encoding key having a sequence of N non-consecutive numbers, wherein each number in the sequence appears once; generate an output signal by selecting each of the N input segments in an order based on the sequence of N non-consecutive numbers in the encoding key; and cause a speaker to produce audio tones in an audio space based on the output signal.

17. The system of clause 16, wherein each input segment in the N input segments is associated with a respective first position of the input segment in the N input segments, and wherein generating the output signal comprises: generating a rearranged sequence of the N input segments, wherein each input segment has a respective second position in the rearranged sequence, and the respective second position is based on a respective position of a number corresponding to the respective first position in the sequence of N non-consecutive numbers, wherein the output signal is based on the rearranged sequence.

18. The system of clause 16 or clause 17, wherein the output signal has a discontinuity in frequency at a boundary between a first output signal segment that corresponds to a first one of the N input segments and a second output signal segment that corresponds to a second one of the N input segments that is adjacent to the first output signal segment.

19. The system of any of clauses 16-18, wherein the output signal includes at least one segment having a lower frequency range than a frequency range of a previous segment of the output signal.

20. The system of any of clauses 16-19, wherein N is based on a length of the frequency sweep signal and a predetermined length of each input segment.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for generating a signal for measuring a spatial impulse response, the method comprising:

generating a frequency sweep signal having a monotonically increasing frequency;

partitioning the frequency sweep signal into N input segments, each of the N input segments representing a different frequency range, wherein each input segment in the N input segments is associated with a respective first position of the input segment in the N input segments;

generating an encoding key having a sequence of N non-consecutive numbers, wherein each number in the sequence appears once;

generating an output signal by selecting each of the N input segments in an order based on the sequence of N non-consecutive numbers in the encoding key, wherein:

the output signal comprises a rearranged sequence of the N input segments, each input segment has a respective second position in the rearranged sequence, and the respective second position is based on a respective position of a number corresponding to the respective first position in the sequence of N non-consecutive numbers; and causing a speaker to produce audio tones in an audio space based on the output signal.

2. The method of claim 1, wherein the output signal has a discontinuity in frequency at a boundary between a first output signal segment that corresponds to a first one of the N input segments and a second output signal segment that corresponds to a second one of the N input segments that is adjacent to the first output signal segment.

3. The method of claim 1, wherein the output signal includes at least one segment having a lower frequency range than a frequency range of a previous segment of the output signal.

4. The method of claim 1, wherein N is based on a length of the frequency sweep signal and a predetermined length of each input segment.

5. The method of claim 1, wherein generating the output signal comprises:

including, in the output signal, a period of silence of a given length between each pair of adjacent input segments.

6. The method of claim 1, wherein generating the output signal further comprises one or more of:

converting, in each segment of the N input segments, a beginning fade-in portion of the segment to a fade-in portion having an amplitude that increases over a period of time, or converting, in each segment of the N input segments, a portion of the segment that ends at an end of the segment to a fade-out portion having an amplitude that decreases over a period of time.

7. The method of claim 1, further comprising:

capturing, using a microphone, sound data based on sound waves that occur in the audio space;

generating an input signal based on the sound data;

partitioning the input signal into N received segments, each of the N received segments representing a different frequency range;

generating a decoded signal by selecting each received segment of the N received segments in an order based on the sequence of N non-consecutive numbers in the encoding key, the decoded signal having a monotonically increasing frequency; and determining a spatial impulse response based on the decoded signal.

8. The method of claim 7, further comprising filtering each received segment with a band pass filter having a frequency range based on the frequency range of the received segment.

9. The method of claim 8, wherein the filtering is performed on each of the N received segments before generating the decoded signal.

10. The method of claim 7, further comprising removing a fade-in portion and a fade-out portion of each received segment in the N received segments.

11. The method of claim 1, further comprising sending the encoding key and one or more input segment lengths to one or more receiver devices, wherein each input segment length indicates a length of an input segment in the N input segments.

12. One or more non-transitory computer-readable media storing program instructions that, when executed by one or more processors, cause the one or more processors to perform steps of:

generating a frequency sweep signal having a monotonically increasing frequency;

partitioning the frequency sweep signal into N input segments, each of the N input segments representing a different frequency range, wherein each input segment in the N input segments is associated with a respective first position of the input segment in the N input segments;

generating an encoding key having a sequence of N non-consecutive numbers, wherein each number in the sequence appears once;

generating an output signal by selecting each of the N input segments in an order based on the sequence of N non-consecutive numbers in the encoding key, wherein:

the output signal comprises a rearranged sequence of the N input segments, each input segment has a respective second position in the rearranged sequence, and the respective second position is based on a respective position of a number corresponding to the respective first position in the sequence of N non-consecutive numbers; and causing a speaker to produce audio tones in an audio space based on the output signal.

13. The one or more non-transitory computer-readable media of claim 12, wherein the output signal has a discontinuity in frequency at a boundary between a first output signal segment that corresponds to a first one of the N input segments and a second output signal segment that corresponds to a second one of the N input segments that is adjacent to the first output signal segment.

14. The one or more non-transitory computer-readable media of claim 12, wherein the sequence of N non-consecutive numbers included in the encoding key is further based on at least one random value.

15. The one or more non-transitory computer-readable media of claim 12, the steps further comprising sending the encoding key and one or more input segment lengths to one or more receiver devices, wherein each input segment length indicates a length of an input segment in the N input segments.

16. A system, comprising:

one or more memories storing instructions; and one or more processors coupled to the one or more memories and, when executing the instructions:

generate a frequency sweep signal having a monotonically increasing frequency;

partition the frequency sweep signal into N input segments, each of the N input segments representing a different frequency range, wherein each input segment in the N input segments is associated with a respective first position of the input segment in the N input segments;

generate an encoding key having a sequence of N non-consecutive numbers, wherein each number in the sequence appears once;

generate an output signal by selecting each of the N input segments in an order based on the sequence of N non-consecutive numbers in the encoding key, wherein:

the output signal comprises a rearranged sequence of the N input segments, each input segment has a respective second position in the rearranged sequence, and the respective second position is based on a respective position of a number corresponding to the respective first position in the sequence of N non-consecutive numbers; and cause a speaker to produce audio tones in an audio space based on the output signal.

17. The system of claim 16, wherein the output signal has a discontinuity in frequency at a boundary between a first output signal segment that corresponds to a first one of the N input segments and a second output signal segment that corresponds to a second one of the N input segments that is adjacent to the first output signal segment.

18. The system of claim 16, wherein the output signal includes at least one segment having a lower frequency range than a frequency range of a previous segment of the output signal.

19. The system of claim 16, wherein N is based on a length of the frequency sweep signal and a predetermined length of each input segment.

20. The system of claim 16, the steps further comprising sending the encoding key and one or more input segment lengths to one or more receiver devices, wherein each input segment length indicates a length of an input segment in the N input segments.

* * * * *